United States Patent [19]

Boochever et al.

[11] 4,118,945
[45] Oct. 10, 1978

[54] ENTHALPY CONTROL FOR AN ENVIRONMENTAL HUMIDIFICATION AND COOLING SYSTEM

[76] Inventors: Evelyn Boochever; Michael Munk, both of 28 Dorchester Dr., Port Chester, N.Y. 10573

[21] Appl. No.: 717,586

[22] Filed: Aug. 25, 1976

Related U.S. Application Data

[63] Continuation-in-part of Ser. No. 625,923, Oct. 28, 1975, Pat. No. 4,042,016.

[51] Int. Cl.² .................. F25D 17/04; F24H 3/02; B05B 3/14
[52] U.S. Cl. .................................. 62/176 C; 165/20; 239/102
[58] Field of Search ............... 236/44 B; 165/19, 20; 62/176 C, 176 R; 239/102 X, DIG. 20; 261/DIG. 48, DIG. 78, 78 A, 30

[56] References Cited

U.S. PATENT DOCUMENTS

| | | | |
|---|---|---|---|
| 2,195,781 | 4/1940 | Newton | 62/176 C |
| 2,257,462 | 9/1941 | Gildersleeve et al. | 62/176 C |
| 2,392,553 | 1/1946 | Rollins | 165/2 |
| 2,723,837 | 11/1955 | Pennington | 62/176 |
| 2,884,205 | 4/1959 | Van Buren | 261/78 |
| 3,103,105 | 9/1963 | Weil | 62/176 C |
| 3,326,538 | 6/1967 | Merritt | 261/48 |
| 3,662,557 | 5/1972 | Morgan | 261/78 |
| 3,774,846 | 11/1973 | Schuric et al. | 239/102 |
| 3,835,810 | 9/1964 | Hughes | 239/102 |
| 3,872,684 | 3/1975 | Scott | 62/183 |
| 3,874,595 | 4/1975 | Rindisbacher | 239/102 |
| 3,979,922 | 9/1976 | Shavit | 165/16 |

*Primary Examiner*—Lloyd L. King
*Attorney, Agent, or Firm*—Charles E. Baxley

[57] ABSTRACT

An environmental humidification and evaporative cooling system including a cooling unit receptive of air streams from an enclosure for cooling same. Enthalpy control is effected during evaporative cooling and humidification for an enclosed environment by the spraying of moisture into a return air stream by an ultrasonic spray nozzle and the level of humidification is controlled by the actuation and modulation of the ultrasonic spray nozzle.

7 Claims, 6 Drawing Figures

ENTHALPY CONTROL FOR AN ENVIRONMENTAL HUMIDIFICATION AND COOLING SYSTEM

BACKGROUND OF THE INVENTION

This application is a continuation-in-part application of application Ser. No. 625,923 filed Oct. 28, 1975, now U.S. Pat. No. 4,042,016.

The present invention relates to an environmental air humidification and cooling system having enthalpy control.

Certain closed environments such as computer rooms require air conditioning that has a fixed cooling and rigid humidity control for a proper machine environment resulting in large enthalpy changes. In known systems, dehumidification and cooling are achieved by the control of cooling coils and humidification is achieved by evaporating water within the body of the air conditioning unit by the use of immersion heaters or evaporation lamps or in some cases steam injection.

In prior art systems, air is heated by equipment operated within the computer room and is returned to the air conditioning unit. This return air is drawn through filters and blown through cooling coils. The cooling coils are temperature controlled to satisfy either the leaving temperature or the room temperature directly. The humidity in the room is sensed and the unit will dehumidify or humidify to maintain the room set point. By use of the air conditioning controls during humidification, the air must be far enough from saturation to accept moisture and this causes subcooling to accommodate the additional moisture and the inherent temperature rise.

In the known air conditioning units, air is cooled in condenser units which are completely dependent on the ambient dry bulb temperature of the air therein. Thus, if the air that is entering the condenser has been heated by equipment in the environment, or if it is outside air during the hot summer period, the air conditioning unit has an overall lower performance and lower efficiency.

Closed environment air conditioning systems also require winter cooling as well as winter humidification. In the winter, air conditioning systems have normal operating ranges of from 74° to 78° F. and from 20% to 16% relative humidity. In environments of this type, such as in buildings, it can be shown that the internal vapor pressure is essentially in equilibrium with the external vapor pressure. Additionally, there is a stack effect created by the cold heavy air mass against the warm dry air building mass. Therefore winter humidification as well as cooling is a desirable characteristic in the system.

In air conditioning systems enthalpy changes alone are important with respect to energy considerations and the known systems utilize a large enthalpy change during cooling.

Enthalpy control is a big step in energy conservation. For example, the greater New York weather deck clearly shows 620 hours throughout the cooling season during which outside air wet bulb is significantly lower than the building return air wet bulb usually requiring large enthalpy changes. The system on recognition of enthalpy, changes over, from the minimum outside air position to the 100% outside air to utilize the lower enthalpy air for conditioning.

SUMMARY OF THE INVENTION

The main object of the present invention is to provide an evaporative cooling and humidification system having enthalpy control which will eliminate the disadvantages of prior art air conditioning systems, by increasing energy savings utilizing enthalpy changeover in conjunction with evaporative cooling.

It is another object of the present invention to provide a cooling and humidification system that can be used during both summer and winter conditions and which will operate at greater efficiencies than known systems.

It is still a further object of the present invention to provide a system that can lend itself to the modification of existing air conditioning units and systems.

These and other objects of the present invention are achieved in the evaporative cooling system of the present invention, which is receptive of return air from an enclosure and comprises a cooling unit receptive of either outside or return air for cooling same and means for controlling the enthalpy of the system during the cooling of the optimum enthalpy air. The enthalpy control means includes actuatable ultrasonic spray means receptive of a supply of water during use for atomizing the water and spraying same into the return or supply air and means for actuating and modulating the ultrasonic spray means to control the level of humidification in the conditioned air.

Having in mind the above and other objects that will be obvious from an understanding of the disclosure, the present invention comprises a combination and arrangement of parts illustrated in the presently preferred embodiments of the invention which are hereinafter set forth in sufficient detail to enable those persons skilled in the art to clearly understand the function, operation, construction and advantages of it when read in conjunction with the accompanying drawings.

DETAILED DESCRIPTION OF THE PREFERRED EMBODIMENTS

Figure 1:
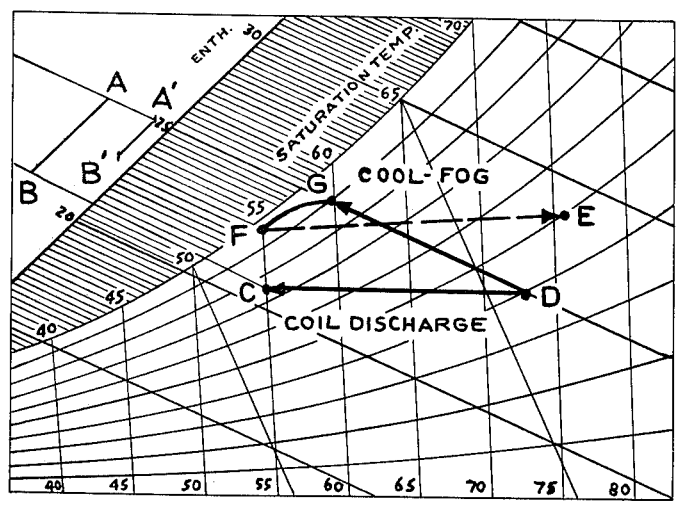
FIG. 1 is a psychometric diagram of the operation of the system of the present invention comparing conventional means as compared to evaporative cooling.

FIG. 1 illustrates graphically the enthalpy control obtainable by the system of the present invention.

Evaporative cooling follows a line of constant wet bulb temperature, such as the line DG in FIG. 1. If, in evaporative cooling, air at a condition such as at D in FIG. 1 passes through spray-type equipment, and use is made of unrecirculated water that is not externally heated or cooled, the air cools and its relative humidity is increased. The processs is an adiabatic one in which the sensible-heat decrease in the air is balanced by the latent heat of the water which evaporates into it, and the original wet-bulb temperature of the air remains unchanged.

The psychometric diagram of FIG. 1 illustrates the application of the present invention to Enthalpy Changeover cycle. The outside air to coil discharge load line AB, for the outside wet bulb temperature lower than the return air web bulb temperature, is exactly twice the magnitude of the equivalent load line A'B' which can be effected by the present invention.

For 10,000 CFM, AB equals 14.1 tons of cooling while the equivalent cycle A'B' load is 7.0 tons of cooling. Even deducting the air compressor input energy, the overall energy transaction efficiency increases approximately 50 percent.

Thus by controlling the humidity line the enthalpy of the system is controlled.

Figure 2:
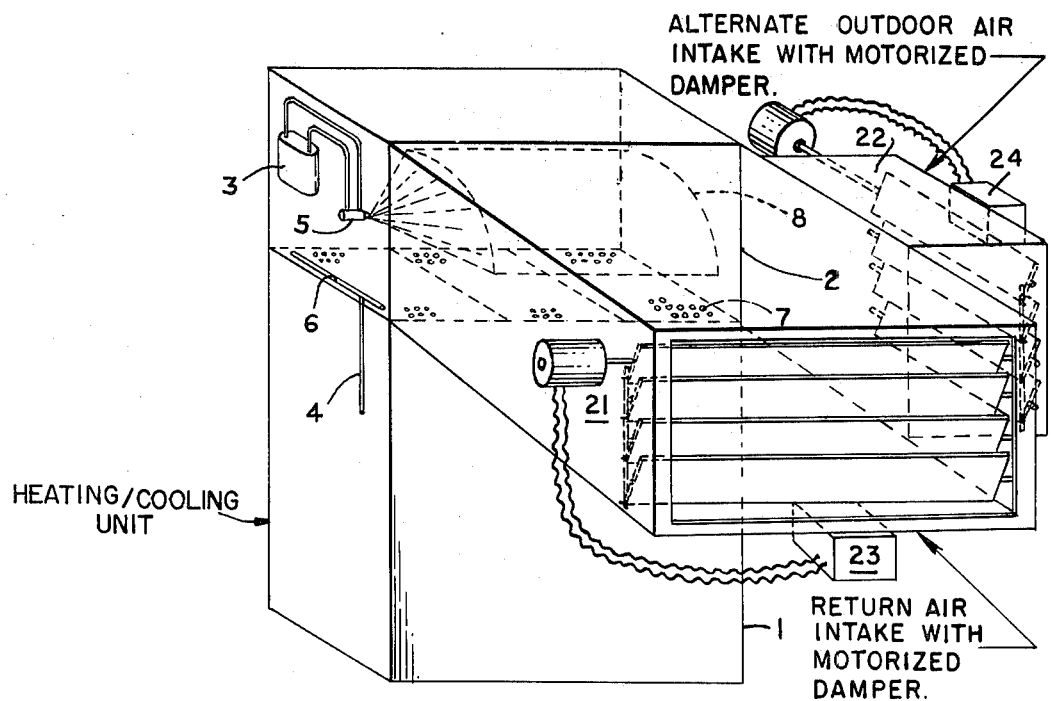
FIG. 2 is a perspective view of a cooling and humidification system according to the present invention.

The enthalpy control is illustrated in FIG. 2 which shows an air conditioning unit 1 having a top portion of plenum 2 with an open face to the room. Located in the top portion or plenum 2, is ultrasonic spray means including ultrasonic spray nozzle 5 and the compressor and the controls for the spray nozzle 3. The ultrasonic spray nozzle 5 atomizes water that is supplied thereto by the use of a high velocity gas flow from a compressor or the like which creates a standing sonic shock wave therein. As the pressurized gas such as air flows into the nozzle, liquids such as water are pumped into the shock wave and are vigorously sheared into fine droplets.

The atomized spray or moisture is applied in a conical spray cone 8 to the air returning to the unit in top portion 2 and acts to control the enthalpy during the evaporatively cooling by humidifying the returning air, yielding a temperature drop as the air is simultaneously being humidified. The air is then filtered through filter 7 and fed into the air conditioning unit thus reducing the cooling load thereon. The condensed spray or unused moisture flows down drip gutter 6 through tube 4 to the bottom of the unit 1. Outdoor and return dampers 21, 22 are controlled to switch by temperature and enthalpy sensors 23 and 24 each of which sense temperature and enthalpy to effect the comparison of these values for the outdoor and return air by conventional comparison means (not shown).

The use of the ultrasonic spray nozzle reduces the size of the water particles to the ten to twenty micron range. Any solids that are present in the air stream or in the water can be filtered out by filter 7 since the pollutants have a size that is much greater than the minute size of the water droplets.

Figure 3:
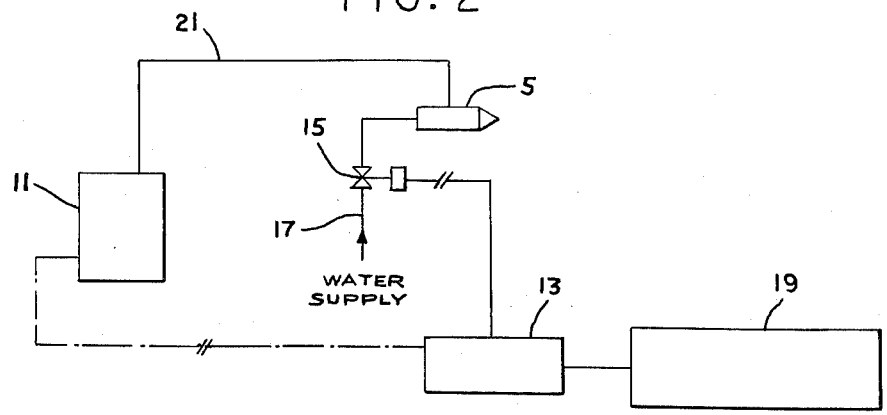
FIG. 3 is a schematic diagram of an all electric control for the system shown in FIG. 2.

FIG. 3 shows the all electric control for the system of FIG. 2. Nozzle 5 receives a flow of pressurized air from compressor 11 through air line 21 and the nozzle 5 receives a supply of water through water line 17 that is controlled by electric solenoid valve 15. Humidistat 19 senses the humidity of the environment and controls the humidifier relay 13 when the humidity exceeds a given value. The humidifier relay 13 then controls electric solenoid valve 15 and air compressor 11 to turn them off and thus reduce the humidity of the resulting cooled air. When the humidistat 19 senses that the humidity is below the given value, the humidifier relay then turns on the air compressor 11 and opens the solenoid valve 15 to permit humidification of the returning air.

Figure 4:
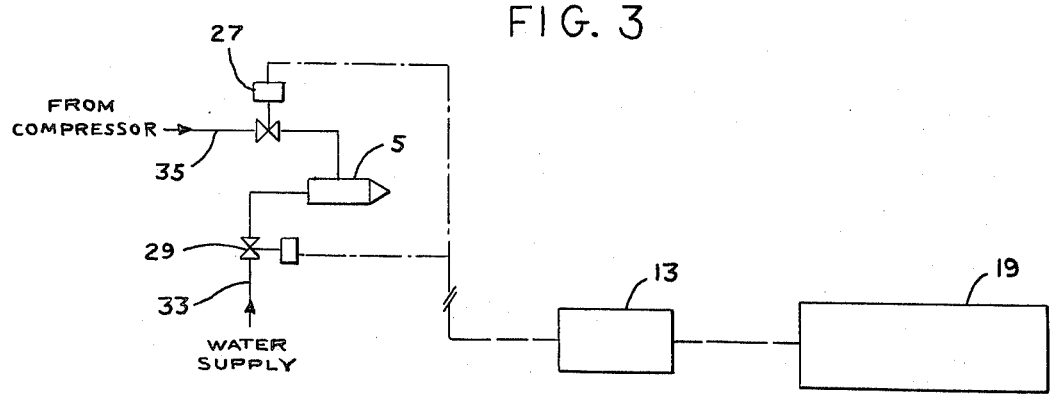
FIG. 4 is a schematic diagram for an all pneumatic control of the system shown in FIG. 2.

In FIG. 4, pneumatic control is provided for the system. Nozzle 5 has the air supplied on air line 35 and is controlled by pneumatic control valve 27. The water is supplied on water line 33 and is controlled by pneumatic control valve 29. The humidistat 19 senses the humidity in the room in a manner similar to the electric control and the pneumatic humidifier controller 13 modulates the pneumatic control valves 27 and 29.

Figure 5:
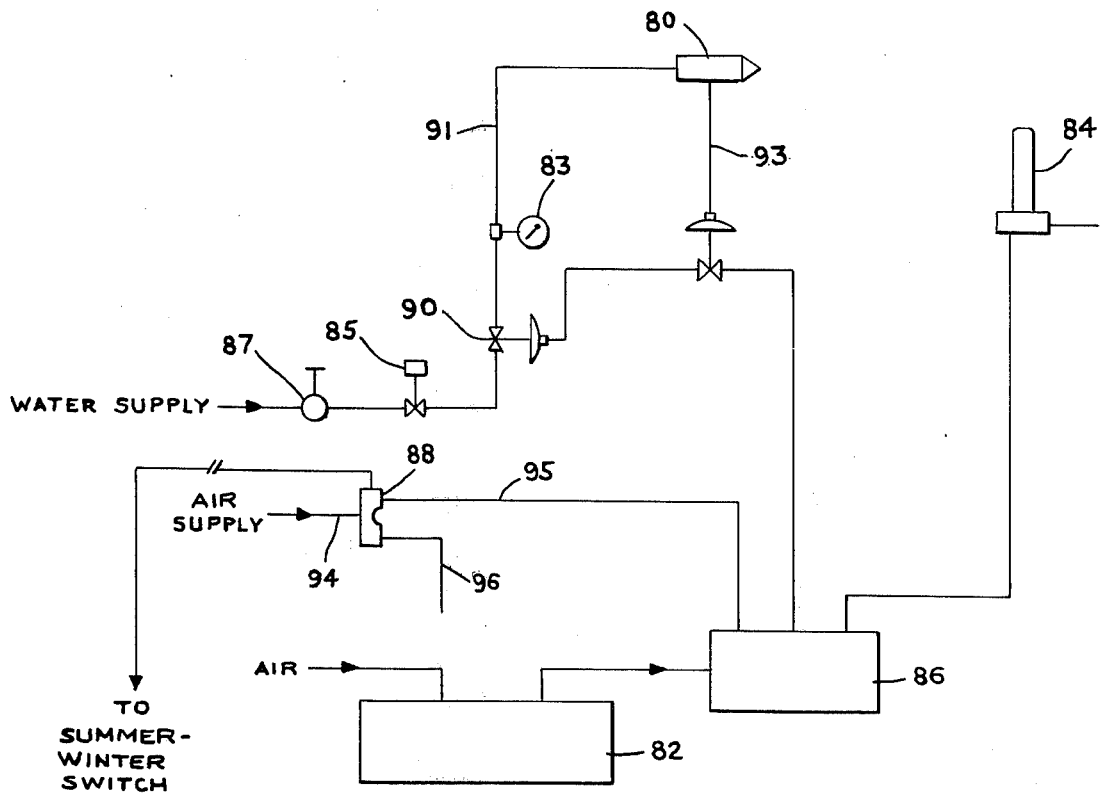
FIG. 5 is a schematic diagram of the humidification and cooling system according to the present invention.

FIG. 5 shows another application of the enthalpy control for evaporative cooling in an air conditioning unit. The evaporative cooling to a circulating air mass will reduce the dry bulb temperature and increase the web bulb temperature to substantially offset the use of cooling energy. In the system shown in FIG. 5, a fixed minimum outside air is utilized and continual air conditioning throughout the operating year is required. Under normal conditions, the operation must provide reasonable insulation and perimeter heating to avoid condensation of a 30% relative humidity air mass. Also the system typically must operate with a 20% to 30% outside air rate and it must have the ability to do winter cooling with approximately 60° to 63° F. dry bulb air.

The system shown in FIG. 5 has a pneumatic control cycle. The ultrasonic nozzle 80 is supplied with water through water line 91 having pressure gauge 83 thereon and which is controlled by normally closed modulating water valve 90, needle valve 87 and solenoid valve 85. The air input to the ultrasonic nozzle 80 is supplied through air line 93 which is controlled by receiver controller 86 which also controls the normally closed modulating water valve 90. The receiver controller 86 is connected to the discharge duct mounted thermostat 84 which has a summer-winter switch (not shown) thereon set to a given temperature such as 60° F. for winter. The receiver controller 86 is also fed by high limit humidistat 82 which receives a given air pressure supply and which overrides the receiver controller 86 if the humidity goes beyond a predetermined high limit. The evaporative cooling electric control valve 88 is wired to the summer-winter switch and is also connected through air line 94 to the main or auxiliary air supply and through air line 95 to the receiver controller 86. Any listed electrical control device may be replaced by its pneumatic counterpart.

In operation, the summer-winter switch energizes the evaporative cooling electric control valve 88 through the action of the discharge duct mounted thermostat 84. This permits the evaporative cooling of the mixture of returned air mass and fresh air mass. The high limit humidistat 82 will override and maintain a maximum humidity to avoid condensation. When the system switches over to cooling, the electric control valve 88 is de-energized.

The cycle of operation can be controlled electrically or electronically in an analogous manner to the above described pneumatic operation, giving freedom in assembly of the most reliable system components. In a major building complex controlled by a computer or data center many systems are similarly controlled by computer driven control devices under program control.

Figure 6:
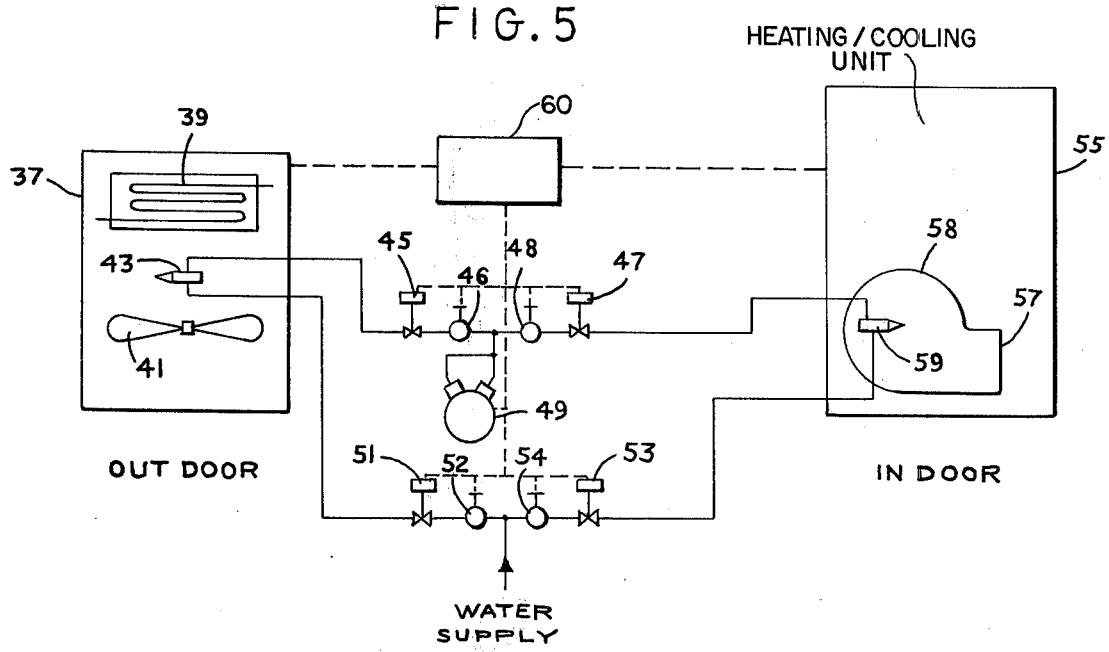
FIG. 6 is a schematic diagram of another embodiment of the cooling and humidification system of the present invention.

FIG. 6 illustrates an air conditioning system wherein the evaporative cooling is applied to a standard air cooled condenser 37 and humidification is applied to the fan of a heating/cooling unit 55.

The system includes heating/cooling unit 55 which includes fan 57 having the ultrasonic spray nozzle 59 disposed in the suction chamber 58 thereof. The heating/cooling unit 55 is receptive of the return or recirculated indoor air in the environment. The condenser cooling unit 37 receives outdoor air and includes condenser coil 39 and condenser fan 41 and ultrasonic spray nozzle 43 for supplying the evaporative cooling spray. Compressor 49 provides the pressurized air for spray nozzle 43 through needle valve 46 and normally closed solenoid valve 45. Nozzle 59 receives the air supply from compressor 49 through needle valve 48 and normally closed solenoid valve 47. The water supply to nozzle 43 is supplied through needle valve 52 and normally closed solenoid valve 51 and the water supply to nozzle 59 is supplied through needle valve 54 and normally closed solenoid valve 53.

The controls for the solenoid valves and the fan and the compressor are similar to the pneumatic or electric control systems described heretofore. In operation, when the system is cooling, a relay (not shown) starts the fan 57 and the air compressor 49 and opens valves 45 and 51 as well as starting the normal cooling function of the heating/cooling unit 55. As a result, the atomized water is discharged into the air stream of the air cooled condenser 37 causing flash cooling of the turbulent air mass therein. The air cooled by the evaporative cooling in the condenser 37 is then fed to the condenser coil unit 39 and is discharged by the fan 41. This configuration varies slightly in physical placement of the coil 39 and the fan 41 due to the large variety of commercial units available on the present market.

When the system is heating, the fan 57 is actuated, as is the air compressor 49 and solenoid valves 53 and 47 enabling humidification of the air blown through fan 57 when called for by the humidistat 60.

While preferred embodiments of the invention have been shown by way of example in the drawings, it will be understood that the invention is in no way limited to these embodiments.

What is claimed is:

1. In an evaporative cooling air conditioning system for an enclosure receptive of return air from the enclosure or outdoor air:
controllable damping means for selecting the most favorable air to be conditioned including means for sensing the temperature/enthalpy of the outdoor and return air to effect comparison thereof to control the damping means to allow the optimal air into the system to achieve maximum cooling prior to the further cooling thereof in the system;
a cooling unit receptive of the optimized air for cooling same; and means for controlling the enthalpy of the system during the cooling of the optimum air comprising actuatable ultrasonic spray means receptive of a supply of water during use for atomizing the water and spraying same into the return air and means for actuating and deactuating the ultrasonic spray means to control the level of humidification in the return air.

2. In an air conditioning system according to claim 1, wherein said ultrasonic spray means comprises an ultrasonic spray nozzle and controllable compressor means for supplying pressurized air to the ultrasonic spray nozzle.

3. In an air conditioning system according to claim 2, wherein the actuating means comprises a humidistat, a solenoid valve controlling the supply of water to the spray nozzle and relay means responsive to the humidistat for controlling the compressor means and the solenoid valve.

4. In an air conditioning system according to claim 3, wherein said actuating means further comprises a second solenoid valve controlling the supply of pressurized air to the spray nozzle and wherein said relay means has means controlling said second solenoid valve.

5. In an air conditioning system according to claim 2, wherein the cooling unit includes a chamber receptive of the optimized air and wherein said ultrasonic spray nozzle is positioned to spray into the otimized air in the chamber.

6. In an air conditioning system according to claim 2, wherein the cooling unit includes an air cooling condenser and wherein said ultrasonic spray nozzle is positioned to spray into the optimized air entering the cooling condenser.

7. In an air conditioning system according to claim 1, wherein the cooling unit includes an air cooling condenser receptive of optimized air to be conditioned and wherein the system further includes a heating/cooling unit receptive of air to be conditioned and blowing means having an air suction chamber receptive of refrigerant from the cooling condenser and the heating/cooling unit, wherein said ultrasonic spray means comprises a first ultrasonic spray nozzle positioned to spray into said suction chamber and wherein said actuating means includes means for alternatively actuating the first or second spray nozzle in dependence upon temperature conditions and control signals.

* * * * *